Figure 2:
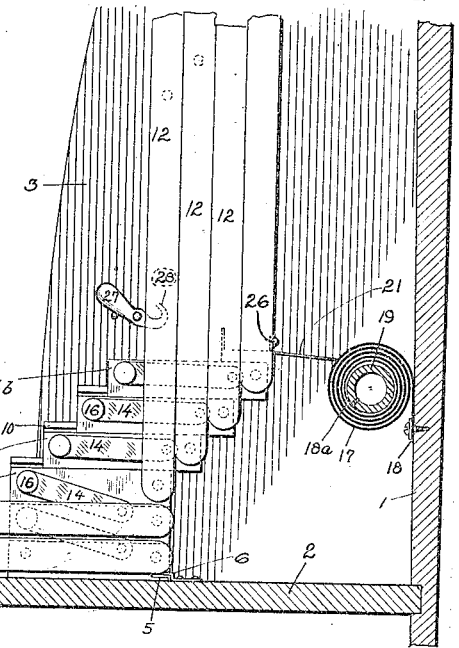

G. JACOBS.
FILING CABINET.
APPLICATION FILED SEPT. 4, 1908.

922,591.

Patented May 25, 1909.
3 SHEETS—SHEET 1.

WITNESSES:
Harry O. Rastetter
Ruth A. Miller

INVENTOR
George Jacobs,
BY
Harry Frease
ATTORNEY

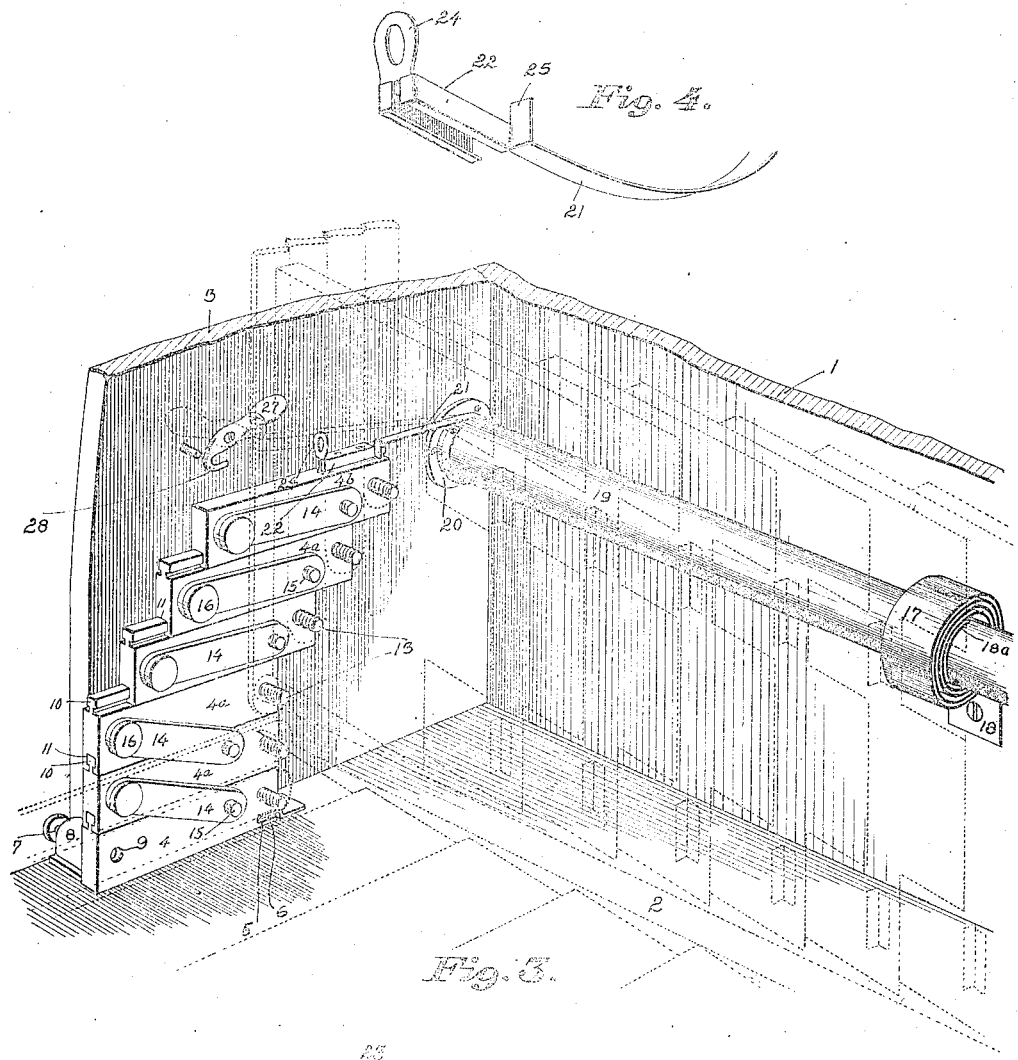

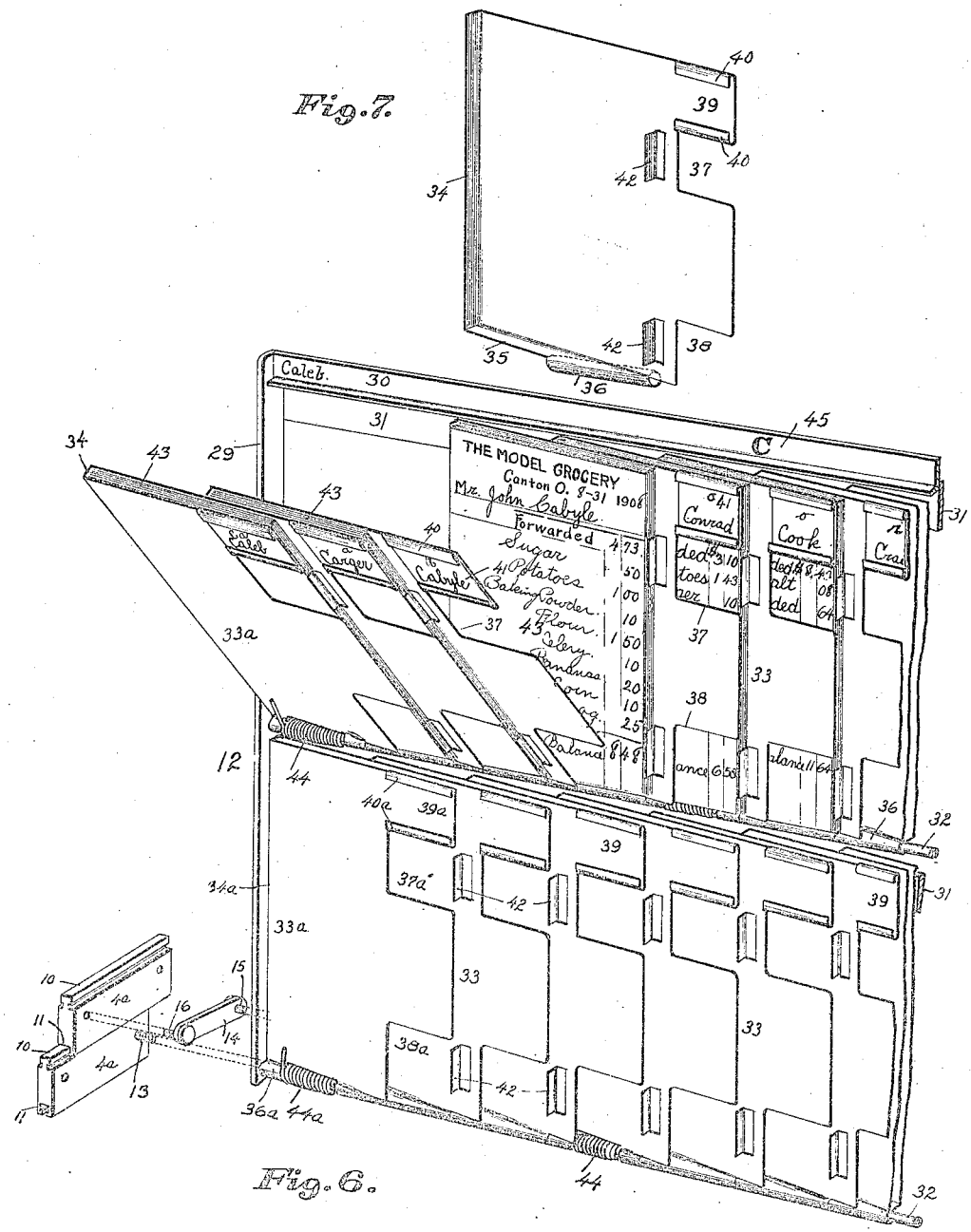

UNITED STATES PATENT OFFICE.

GEORGE JACOBS, OF CANTON, OHIO, ASSIGNOR TO HARRY FREASE, TRUSTEE, OF CANTON, OHIO.

FILING-CABINET.

No. 922,591.

Specification of Letters Patent.

Patented May 25, 1909.

Application filed September 4, 1908. Serial No. 451,635.

*To all whom it may concern:*

Be it known that I, GEORGE JACOBS, a subject of the Emperor of Germany, residing at Canton, in the county of Stark and State of Ohio, have invented a new and useful Filing-Cabinet, of which the following is a specification.

The invention relates to a filing cabinet for bills of sales or accounts, as of a retail merchant, and more particularly to that class of cabinets containing a series of leaves normally located uprightly in echelon, so that the upper edge of each leaf is exposed above the edge of the leaf in front of it, the leaves being hinged or pivoted and adapted to be folded forward for the purpose of exposing and giving access to the sides of the several leaves.

One object of the invention is to provide means for individually and collectively connecting and gearing the leaves so that, when folded forward to a prone position, or when removed from the case, they are adapted to be collocated or assembled face to face in a rectangular pack, within a space substantially equal to the area of one leaf and the combined depth of all the leaves, so that in this relation the entire series of leaves can be readily inserted in a safe or vault for security without consuming undue space therein.

A further object of the invention is to provide means for automatically moving the upright leaves forward or backward at the same time the leaves in front of them are lowered or raised, so that the foremost one of the uprightly disposed leaves always occupies the same vertical plane and is, therefore, conveniently accessible for inserting and removing bills at the same distance from the forward side of the cabinet.

Another object of the invention is to provide detachable means for counter-balancing the series of leaves to hold them, individually and collectively, in the normal upright position, and so that when one or more leaves are started upward from the prone position, they are automatically thrown to and then remain in the upright position.

The invention also relates to the construction and arrangement of the filing racks which are provided in each leaf of the cabinet; and the object of this improvement is to provide one or more series of laterally overlapping racks, the racks of each series being pivoted on the same axis located at the lower ends of the racks of the series and being provided with controlling springs to hold the racks normally closed against the leaf, and the exposed edges of the racks being notched, whereby a large number of separate account slips are adapted to be filed on one side of the leaf with certain portions thereof exposed, the slips of each account being readily accessible from the same side of the leaf.

These general objects and other advantages are attained by the construction, mechanism and arrangement illustrated in the accompanying drawings, forming part hereof, in which—

Figure 1:
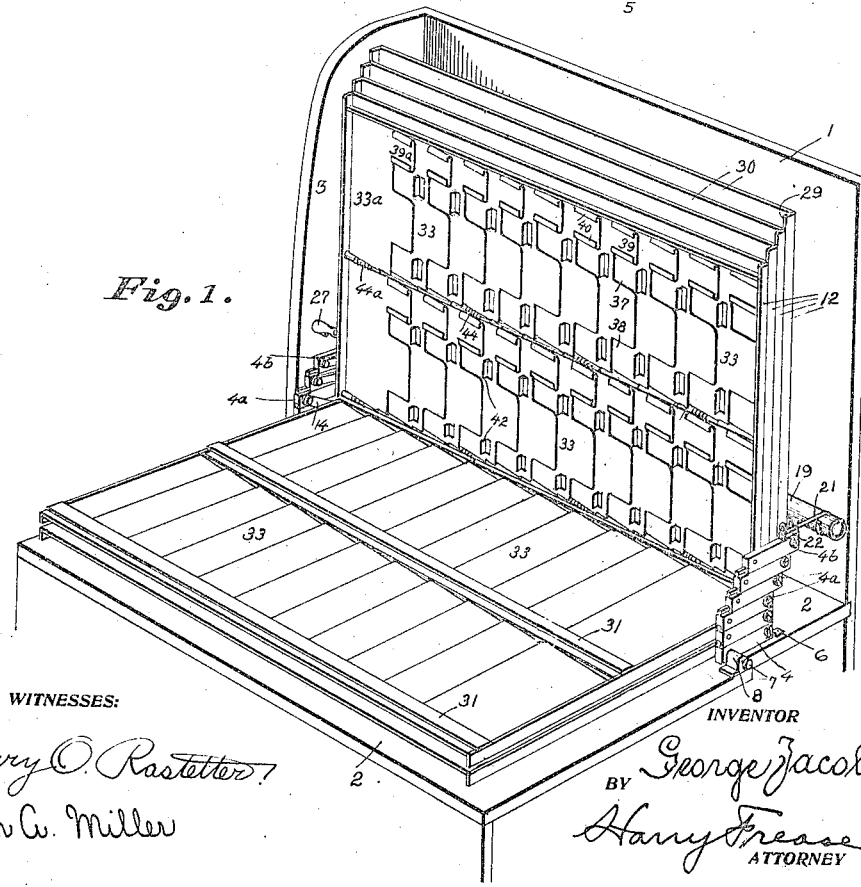

Figure 1 is a perspective view of the cabinet containing a small number of leaves, with one side of the case removed, and having two leaves folded downward in a prone position and the other leaves standing upright in the normal position; Fig. 2, a fragmentary vertical-longitudinal section of the cabinet mechanism; Fig. 3, a fragmentary perspective view illustrating one tier of gearing blocks and links and the controlling spring mechanism, showing the leaves in broken lines; Fig. 4, a detached perspective view of the connecting-tape bracket; Fig. 5, a perspective view of the leaves and the gearing blocks removed from the cabinet, the leaves being collocated in a rectangular pack; Fig. 6, a detached perspective view of a portion of one leaf showing the cover and two filing racks of the upper series opened forward and exposing for access the contents of the third rack, and showing two gearing blocks and one link separated opposite their connected position; and Fig. 7, a detached perspective view of one filing pocket.

Similar numerals refer to similar parts throughout the drawings.

The case of the cabinet preferably includes the back 1, the bottom 2 and the sides 3. A tier of bearing blocks 4, 4$^a$ and 4$^b$, is normally located in each side of the case; the base block 4 of each tier being detachably secured to the bottom of the case by engaging the transverse groove 5 provided in the rear end of each of the base blocks with the tongue 6 formed or attached on the bottom of the case, and then fastening the forward end of each base block by means of the bolt 7 in the bearing 8, the end of which bolt is adapted to enter the aperture 9 provided in the forward end of each base block for that purpose.

Each base block 4 and each intermediate block 4ª is provided with a T-shaped tongue 10 on its upper edge, and each intermediate block 4ª and each top block 4ᵇ is provided with a T-shaped groove 11 in its lower edge; which grooves are adapted to interengage with the tongues of the blocks next below, so that all of the blocks in each tier are adapted to slide endwise one upon another and at the same time are held together to form a supporting frame at each side of the leaves.

The leaves 12 are normally collocated uprightly in echelon and the lower corners of the leaves are pivotally connected with the rear ends of respective blocks, as by means of the pivot screws 13. A series of links 14 is provided between the sides of the leaves and the inner sides of the blocks, the rear ends of the links being pivotally connected with the side edges of the leaves at an interval above the leaf block pivot, as by means of the pivot screws 15, and the forward ends of the links being pivotally connected to the forward ends of the blocks as by means of the pivot screws 16. By means of this mechanism, it is evident that when one leaf is rotated forward on its pivots, the bearing block next above with all the superimposed blocks will be moved forward at the same time, and vice versa; and the gearing is so proportioned that the longitudinal movement of each block caused by the rotation of the actuating leaf from its normal upright position to and from a prone position, is approximately equal to the interval occupied by one upright leaf, which interval is preferably the same as the projection of one leaf above another. The parts are so proportioned and arranged that when the leaves are all folded forward to a prone position, the leaves will be collocated in a rectangular pack and in close contact with each other, and the bearing blocks on each end of the pack will be arranged in upright tiers, as shown in Fig. 5; and it is evident that when the leaves are rotated rearward to their normal position, the blocks will slide one upon another and the leaves will be compactly collocated in upright echelon, as shown for the upright leaves in Figs. 1 and 2.

It will be seen that two particular advantages are attained by connecting the links to the forward ends of the blocks, as herein set forth, for the reason that the rear ends of the respective blocks do not extend backward beyond the rear faces or ends of the corresponding leaves, in the several positions thereof, whereby less space is taken up by the leaves and blocks when they are removed from the case in the form of a rectangular pack, as illustrated in Fig. 5; and for the reason that the links in their movements do not cross the axes of the leaf pivots, and they can thus be located between the side edges of the leaves and the sides of the blocks; all of which permits of a compact construction coupled with positive operation.

The leaf controlling spring 17 is preferably in the form of a coil, one end 18 of which is connected with the back of the case and the other end 18ª to the roller 19, which roller is transversely located adjacent to the back wall of the case with its ends pivotally supported as at 20 on the side walls of the case. A connecting band as 21 is secured at its rear end to each end of the roll, around which the band is wrapped one or more times, and at its forward end to the bracket 22 which is adapted to be detachably connected with the upper bearing block, as by telescoping over the forward end of the T-shaped flange 23 formed on the rear end of the upper edge of the block. On the forward end of the connecting bracket is provided the upturned loop 24 and on the rear end the inturned flange 25, against which flange the pin 26 formed or secured on the end edge of the rearmost leaf is adapted to abut, whereby the rearmost leaf is always held in upright position in the case. The power of the leaf controlling spring is exerted through the roll and connecting bands to pull the top blocks rearward,—and—the connecting gearings between the other blocks and the leaves serve to normally hold the leaves in their upright position; and the tension of the spring is adjusted so that when the leaves are started upward from their prone position, the spring will positively rotate them backward to their upright position.

A lever 27 is pivotally mounted on each side wall of the case and is normally rotated so that the hook 28 which is provided on one end is above the path of the loop of the connecting bracket. When it is desired to remove the leaves from the case, a few of the upper leaves are rotated to their upright position which brings the loops of the connecting brackets in rear of the hook of the lever, as shown by dotted lines in Fig. 2. The levers are then rotated to bring the hooks downward in the path of the bracket loops with the ends of the hooks presented thereto, whereupon by rotating the upright leaves forward to their prone position, the loops are engaged with the hooks. The upper leaves are then again rotated to their upright position which moves the upper blocks backward, and at the same time the engagement of the bracket loops with the lever hooks holds the brackets forward and permits the T-flanges of the top blocks to be withdrawn therefrom, whereupon the hook levers and connecting brackets and bands assume the position as shown for one side by dotted lines in Fig. 3, which is above the path of the upper blocks, whereupon all the leaves can be rotated forward to their prone position and the rectangular pack is then free to be removed from the case by merely disengaging the bolts of the spring latches from the base blocks. It will be understood that when the leaves and blocks are reëntered in the case, the controlling brackets are reëngaged with the upper blocks by reversing the operation thus described.

Each leaf 12 is preferably composed of a frame including the side bars 29, the upper end angle bar 30, the abutment strips 31 and the axial rods 32, on which axial rods an upper and a lower series of bill racks 33 are pivotally mounted. The body of each bill rack is preferably made of a flat metal sheet, having the forwardly turned flange 34 on one side edge and the similar flange 35 on the adjacent portion of the lower end edge, from the middle portion of which lower edge is formed the journal bearing 36, which is located at a slight angle from the plane of the rack. In the edge of the other side of the rack, which is referred herein as the exposed side, are provided the notches 37 near the upper corner and 38 at the lower corner, and the tongue 39 which is thus formed at the upper corner is preferably provided with the inturned flanges 40 under which an index card, as 41, containing the name of the customer whose account is filed in the rack is adapted to be entered. The forwardly projecting flanges 42 are provided on the exposed face of the rack on the inner sides of the notches, and these flanges are preferably formed by being cut and bent from the body of the rack. The rack thus formed is adapted to receive the bills 43, the lower edges of which rest on the lower edge flange of the rack and the side edges of which are retained between the side edge flange 34 and the exposed flanges 42.

The respective racks are assembled in lateral echelon, with the bearings mounted on the axial rods of the leaf, the inclination of which bearings causes the respective racks to stand at a slight lateral inclination to the plane of the leaf, thus bringing the backs or bodies of the respective leaves parallel with each other and at an interval apart equal to the depth of the forwardly turned flanges. In the bearings of some of the racks are provided the controlling springs 44 which are preferably in the form of coil springs having one end connected to the axial rod and the other end in engagement with the rack, the action of the spring being exerted to hold the rack in its upward normal or closed position, in which position each rack is stopped by the abutment strip 31 pertaining to its series. The cover 33ª is provided at the end of each series, and is provided with the bearing 36ª, with the controlling spring 44ª on the lower end edge, and with the notches 37ª and 38ª, the tongue 39ª and the flanges 40ª on the exposed side, but the other side is cut off to form an edge 34ª in line with the side edge flange of the next adjacent rack over which it laps. By this construction and arrangement of racks, it is evident that the bills of a large number of accounts can be inserted in the respective racks, the bills in each rack being held in position between the retaining flanges by the abutment of the back of the overlapping rack, and at the same time the balance amounts entered at the beginning and end of the last bill in each case is exposed through the notches formed in the edge of the overlapping rack, the index card pertaining to the bill being mounted under the flanges of the tongue of the overlapping rack. Whenever it is desired to remove or insert a bill in any particular rack, the overlapping rack or racks are merely rotated forward on their pivotal bearings, which opens the desired rack, after which the rotated racks are automatically returned to their normal position by action of the controlling spring. By these means, it is possible to file on one side of a given leaf the bills of as many or more different accounts as it has been customary to file on both sides of a leaf, and at the same time the desired information from each particular set of accounts is exposed to view. It is not essential to limit the series of overlapping racks to one side of the leaf as illustrated and described herein, but it is preferred to form the leaves in this manner for the reason that the racks are thus always exposed in an upright position in which relation they are more readily visible to and accessible by the merchant. The general index 45, showing the particular accounts filed in one leaf is indicated on the exposed upper edge 30 thereof, and it is evident that in the form and arrangement of racks herein set forth no other special or separate index is required.

The improvements in filing cabinets which are illustrated and described but not broadly claimed herein, are made the subject-matter of generic claims in two several prior applications for Letters Patent, filed respectively August 17, 1907, Serial No. 388,966 and November 18, 1907, Serial No. 402,585.

What I claim as my invention, and desire to secure by Letters Patent, is—

1. A frame including oppositely-located parallel tiers of spring-controlled endwise-slidable blocks, a series of leaves normally located uprightly in echelon and having their lower-end corners pivoted to the rear ends of respective blocks, and a series of links having their rear ends pivoted to the side edges of the leaves above the block pivots and their forward ends pivoted to the forward ends of adjoining blocks, whereby the leaves are adapted to be rotated to and from a prone position in a rectangular pack, each leaf moving the superimposed blocks and leaves in the same direction the interval of one leaf.

2. A frame including oppositely-located parallel tiers of endwise-slidable blocks, a series of leaves normally located uprightly in echelon and having their lower-end corners pivoted to the rear ends of respective blocks, and a series of links having their rear ends pivoted to the side edges of the leaves above the block pivots and their forward ends pivoted to the forward ends of adjoining blocks, whereby the leaves are adapted to be rotated to and from a prone position in a rectangular pack, each leaf moving the superimposed blocks and leaves in the same direction the interval of one leaf.

3. A frame including oppositely-located parallel tiers of spring - controlled interengaging endwise-slidable blocks, a series of leaves normally located uprightly in echelon and having their lower-end corners pivoted to respective blocks, and a series of links connecting the leaves with adjoining blocks, whereby the leaves are adapted to be rotated to and from a prone position in a rectangular pack, each leaf moving the superimposed blocks and leaves in the same direction the interval of one leaf.

4. A frame including oppositely-located parallel tiers of interengaging endwise-slidable blocks, a series of leaves normally located uprightly in echelon and having their lower-end corners pivoted to respective blocks, and a series of links connecting the leaves with adjoining blocks, whereby the leaves are adapted to be rotated to and from a prone position in a rectangular pack, each leaf moving the superimposed blocks and leaves in the same direction the interval of one leaf.

5. A series of rotatable leaves normally located uprightly in echelon with gearing connections including a tier of spring-controlled endwise-slidable blocks respectively pivoted at their rear ends to corresponding lower-end corners of the leaves, and a series of links pivoted to the leaves above the block pivots and to the forward ends of adjoining blocks, whereby a forward rotation of the leaves to a prone position collocates them in a rectangular pack and vice versa, with a concomitant movement to and fro of the upright leaves.

6. A series of rotatable leaves normally located uprightly in echelon with gearing connections including a tier of endwise-slidable blocks respectively pivoted at their rear ends to corresponding lower-end corners of corresponding leaves, and a series of links pivoted to the leaves above the block pivots and to the forward ends of adjoining blocks, whereby a forward rotation of the leaves to a prone position collocates them in a rectangular pack and vice versa, with a concomitant movement to and fro of the upright leaves.

7. A series of rotatable leaves normally located uprightly in echelon with gearing connections including a spring-controlled tier of interengaging endwise-slidable blocks respectively pivoted to corresponding lower-end corners of corresponding leaves, and a series of links connecting the leaves with adjoining blocks, whereby a forward rotation of the leaves to a prone position collocates them in a rectangular pack and vice versa.

8. A series of rotatable leaves normally located uprightly in echelon with gearing connections including a tier of interengaging endwise-slidable blocks respectively pivoted to corresponding lower-end corners of corresponding leaves, and a series of links connecting the leaves with adjoining blocks, whereby a forward rotation of the leaves to a prone position collocates them in a rectangular pack and vice versa.

9. A series of rotatable leaves normally located uprightly in echelon with gearing connections including a tier of spring-controlled endwise-slidable blocks respectively pivoted at their rear ends to corresponding lower-end corners of the leaves, and a series of links pivoted to the leaves above the block pivots and to the forward ends of adjoining blocks, whereby a forward rotation of the leaves to a prone position collocates them in a rectangular pack and vice versa.

10. A series of rotatable leaves normally located uprightly in echelon with gearing connections including a tier of endwise-slidable blocks respectively pivoted at their rear ends to corresponding lower-end corners of corresponding leaves, and a series of links pivoted to the leaves above the block pivots and to the forward ends of adjoining blocks, whereby a forward rotation of the leaves to a prone position collocates them in a rectangular pack and vice versa.

11. A series of normally upright rotatable leaves with gearing connections including a spring-controlled tier of interengaging endwise-slidable blocks respectively pivoted to corresponding lower-end corners of corresponding leaves, and a series of links connecting the leaves with adjoining blocks, whereby a forward rotation of each leaf to a prone position moves the upright leaves forward the interval of one leaf and vice versa.

12. A series of normally upright rotatable leaves with gearing connections including a tier of interengaging endwise-slidable blocks respectively pivoted to corresponding lower-end corners of corresponding leaves, and a series of links connecting the leaves with adjoining blocks, whereby a forward rotation of each leaf to a prone position moves the upright leaves forward the interval of one leaf and vice versa.

13. A series of leaves located face to face, a tier of endwise-slidable interengaging blocks respectively pivoted to corresponding end corners of the leaves, and links connecting the leaves with adjoining blocks, whereby the leaves are adapted to be collocated either in echelon or in a rectangular pack.

14. A cabinet including a detachable series of leaves normally located uprightly in echelon and having gearing connections whereby they are adapted to be rotated to a forward prone position in a rectangular pack, and vice versa, a roller journaled in rear of the leaves, a tape wound on the roller and detachably connected with the gearing, and a spring acting to rotate the roller to draw and hold the leaves in upright position, with means for detaching and holding the tape from the gearing.

15. A cabinet including a detachable series of leaves normally located uprightly in echelon and having gearing connections whereby they are adapted to be rotated to a forward prone position in a rectangular pack, and vice versa, a roller journaled in rear of the leaves, a tape wound on the roller and detachably connected with the gearing, and a spring acting to rotate the roller to draw and hold the leaves in upright position.

16. A cabinet including a series of leaves normally located uprightly in echelon and having gearing connections whereby they are adapted to be rotated to a forward prone position in a rectangular pack, and vice versa, a roller journaled in rear of the leaves, a tape wound on the roller and connected with the gearing, and a spring acting to rotate the roller to draw and hold the leaves in upright position.

17. A filing leaf including a frame having an axial rod and an abutment therein, a series of laterally inclined bill racks pivoted on the rod and arranged in lateral echelon, and springs acting to hold the racks against the abutment, there being forward flanges on each rack whereby bills are retained between the overlapping portions of the racks.

18. A filing leaf including a frame, an axial rod and an abutment therein, a series of laterally inclined bill racks pivoted on the rod and arranged in lateral echelon, springs acting to hold the racks against the abutment, and means for retaining bills between the overlapping portions of the racks.

19. A filing leaf including a frame having an axial rod therein, a series of laterally inclined bill racks pivoted on the rod and arranged in lateral echelon, and means for normally holding the overlapping portions of the racks together, the exposed edges of one rack being notched to expose part of a bill in the next rack.

20. A filing leaf including a frame having an axial rod therein, a series of laterally inclined racks pivoted on the rod and arranged in lateral echelon, and means for normally holding the overlapping portions of the racks together.

21. A filing leaf including a series of laterally inclined racks arranged in lateral echelon and pivoted on the same axis, and means for normally holding the overlapping portions of the racks together.

22. A filing leaf including a series of laterally inclined racks arranged in lateral echelon and pivoted on the same axis.

GEORGE JACOBS.

Witnesses:
DAVID B. SMITH,
HARRY FREASE.